(12) United States Patent
Wagner et al.

(10) Patent No.: US 11,499,604 B2
(45) Date of Patent: Nov. 15, 2022

(54) LANYARD FOR A TOOL

(71) Applicant: Milwaukee Electric Tool Corporation, Brookfield, WI (US)

(72) Inventors: Andrew G. Wagner, Lisbon, WI (US); Derek Rose, Menomonee Falls, WI (US); Anthony S. Graykowski, Belgium, WI (US); Jesse Marcelle, Muskego, WI (US); Travis J. Beck, Shorewood, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/269,273

(22) Filed: Feb. 6, 2019

(65) Prior Publication Data

US 2019/0170215 A1 Jun. 6, 2019

Related U.S. Application Data

(63) Continuation of application No. PCT/US2017/047887, filed on Aug. 22, 2017.

(Continued)

(51) Int. Cl.
*F16G 11/00* (2006.01)
*F16G 11/12* (2006.01)
(Continued)

(52) U.S. Cl.
CPC ............. *F16G 11/00* (2013.01); *A45F 5/06* (2013.01); *B25H 3/00* (2013.01); *F16B 45/02* (2013.01);
(Continued)

(58) Field of Classification Search
CPC . F16G 11/00; F16G 11/12; A45F 5/06; B25H 3/00; F16B 45/02
(Continued)

(56) References Cited

U.S. PATENT DOCUMENTS 854,293 A * 5/1907 Johnson .................... B66C 1/36
294/82.2
1,373,235 A * 3/1921 Giberson ................ F16B 45/02
294/82.21

(Continued)

FOREIGN PATENT DOCUMENTS

CA 2762029 6/2013
CN 101392787 3/2009
(Continued)

OTHER PUBLICATIONS

International Search Report and Written Opinion for International Application No. PCT/US2017/047887, dated Nov. 20, 2017, 18 pages.

*Primary Examiner* — Peter N Helvey
(74) *Attorney, Agent, or Firm* — Reinhart Boerner Van Deuren s.c.

(57) ABSTRACT

A lanyard assembly including a strap having a first end and a second end, an attachment mechanism coupled to the first end and a quick connect attachment mechanism connected to the second end. The quick connect attachment mechanism includes a swivel member and a cinch for securing a tool coupled to the swivel member. The swivel member is configured to allow rotation between the cinch and the strap and the quick connect attachment mechanism can be quickly engaged and disengaged from the strap to allow the quick connection of various tools.

5 Claims, 7 Drawing Sheets

Related U.S. Application Data (60) Provisional application No. 62/377,899, filed on Aug. 22, 2016, provisional application No. 62/445,849, filed on Jan. 13, 2017.

(51) Int. Cl.
  *B25H 3/00* (2006.01)
  *A45F 5/06* (2006.01)
  *F16B 45/02* (2006.01)
  *A45F 5/00* (2006.01)

(52) U.S. Cl.
  CPC ........ F16G 11/12 (2013.01); *A45F 2005/006* (2013.01)

(58) Field of Classification Search
  USPC .......................................... 224/269
  See application file for complete search history.

(56) References Cited

U.S. PATENT DOCUMENTS

| | | | | |
|---|---|---|---|---|
| 1,473,983 | A * | 11/1923 | Virgil | F16B 45/02 294/82.21 |
| 2,812,123 | A * | 11/1957 | Girton | F41C 33/002 224/584 |
| 2,994,300 | A * | 8/1961 | Grahling | A01K 27/005 119/770 |
| 4,765,037 | A * | 8/1988 | Perry | A61J 17/00 24/3.13 |
| 4,802,264 | A * | 2/1989 | Isenhart | F16B 45/02 24/587.1 |
| 5,505,013 | A * | 4/1996 | Gois | A01K 75/00 24/598.3 |
| 5,517,735 | A * | 5/1996 | Tsai | F16B 45/02 24/599.9 |
| 5,864,929 | A * | 2/1999 | Sakong | F16B 45/02 24/600.1 |
| 6,216,319 | B1 | 4/2001 | Elkins | |
| 6,702,328 | B2 * | 3/2004 | Malleis | A63C 11/00 280/809 |
| 6,752,305 | B2 * | 6/2004 | Shattuck | A45C 11/182 150/145 |
| D682,489 | S * | 5/2013 | Kal | D30/152 |
| D756,107 | S * | 5/2016 | Votel | D3/228 |
| D796,835 | S * | 9/2017 | Mericle | D3/215 |
| 10,099,909 | B2 * | 10/2018 | Steedley | B66F 17/006 |
| 10,138,102 | B2 * | 11/2018 | Baillargeon | A62B 35/0025 |
| 10,514,057 | B2 * | 12/2019 | Cardella | E05B 17/0045 |
| 2003/0167608 | A1 * | 9/2003 | Petzl | F16B 45/02 24/600.2 |
| 2006/0130539 | A1 * | 6/2006 | Yu | E05B 67/10 70/18 |
| 2006/0272890 | A1 | 12/2006 | Harmon | |
| 2008/0009185 | A1 * | 1/2008 | Knoll | A01K 11/004 439/595 |
| 2009/0056088 | A1 * | 3/2009 | Petzl | F16B 45/02 24/599.9 |
| 2009/0127302 | A1 * | 5/2009 | Pruitt | B25B 23/00 224/219 |
| 2010/0147912 | A1 | 6/2010 | Salentine | |
| 2011/0023275 | A1 * | 2/2011 | Thompson | F16B 45/02 24/594.1 |
| 2011/0132944 | A1 | 6/2011 | Gravitis | |
| 2012/0267403 | A1 * | 10/2012 | Ward, Jr. | A45F 5/00 224/219 |
| 2014/0201888 | A1 * | 7/2014 | Bookbinder | A42B 7/00 2/338 |
| 2015/0164204 | A1 | 6/2015 | Moreau | |
| 2015/0208613 | A1 * | 7/2015 | Krasilczuk | A01K 27/003 119/798 |
| 2016/0153487 | A1 * | 6/2016 | Hollinger | F16B 45/02 24/376 |
| 2016/0227911 | A1 | 8/2016 | Benzakin | |
| 2018/0216656 | A1 * | 8/2018 | Bailey | F16B 45/04 |
| 2020/0124082 | A1 * | 4/2020 | Mojica | F16B 45/02 |
| 2020/0268135 | A1 * | 8/2020 | Ollinger | A45F 5/06 |

FOREIGN PATENT DOCUMENTS

| | | |
|---|---|---|
| CN | 202318159 | 7/2012 |
| DE | 202007006840 | 9/2007 |
| EP | 2527670 | 11/2012 |
| JP | 2012232403 | 11/2012 |
| KR | 20-0208710 Y1 | 1/2001 |
| KR | 200208710 | 1/2001 |

* cited by examiner

LANYARD FOR A TOOL

CROSS REFERENCE TO RELATED APPLICATIONS

This patent application is a continuation of International Application No. PCT/US2017/047887, filed on Aug. 22, 2017, which claims priority to U.S. Provisional Application Ser. No. 62/377,899, filed Aug. 22, 2016, and to U.S. Provisional Application Ser. No. 62/445,849 filed on Jan. 13, 2017, which are incorporated herein by reference in their entireties.

BACKGROUND

The invention relates to lanyards for use with tools, and more particularly to heavy duty lanyards including a tracking system.

Lanyards are sometimes used to assure that tools are not dropped or lost during use. However, present lanyards often break making them unreliable and unsuitable for larger or heavier tools. Carabiners are sometimes used to securely clip objects within an interior aperture defined by a frame of the carabiner. The interior aperture is alternatively accessible and inaccessible by virtue of a pivotal locking bar.

SUMMARY

In one construction, a lanyard assembly includes a strap having a first end and a second end, a cinch coupled to the first end, and an attachment member coupled to the second end.

In another construction, a lanyard assembly includes a strap having a first end and a second end, an attachment mechanism coupled to the first end and a quick connect attachment mechanism connected to the second end. The quick connect attachment mechanism includes a swivel member and a cinch for securing a tool coupled to the swivel member. The swivel member is configured to allow rotation between the cinch and the strap and the quick connect attachment mechanism can be quickly engaged and disengaged from the strap to allow the quick connection of various tools.

In another construction, a lanyard for attachment to a hardhat with an aperture includes a strap having a first end and second end, the first end including a first clip and configured to be threaded through the aperture of the hard hat, the second end including a second clip. The first end is configured to be threaded through the first clip, the first clip including a lever configured to fix the first end with respect to the first clip.

In another construction, a lanyard assembly includes a strap having a first end and a second end, a swivel member coupled to the first end, and a cinch coupled to the swivel member, the swivel member configured to allow rotation between the cinch and the strap. The lanyard assembly further includes a carabiner coupled to the second end and including a frame with a pivot end and a locking end, an interior aperture defined by the frame, and a locking bar defining an axis and having a first end pivotally coupled to the pivot end and an opposite second end defining a recess. The locking end of the frame is configured to fit within the recess to define a mating position between the locking end of the frame and the second end of the locking bar. When the second end is in the mating position with the locking end, the locking end and the second end are prevented from moving with respect to each other along the axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
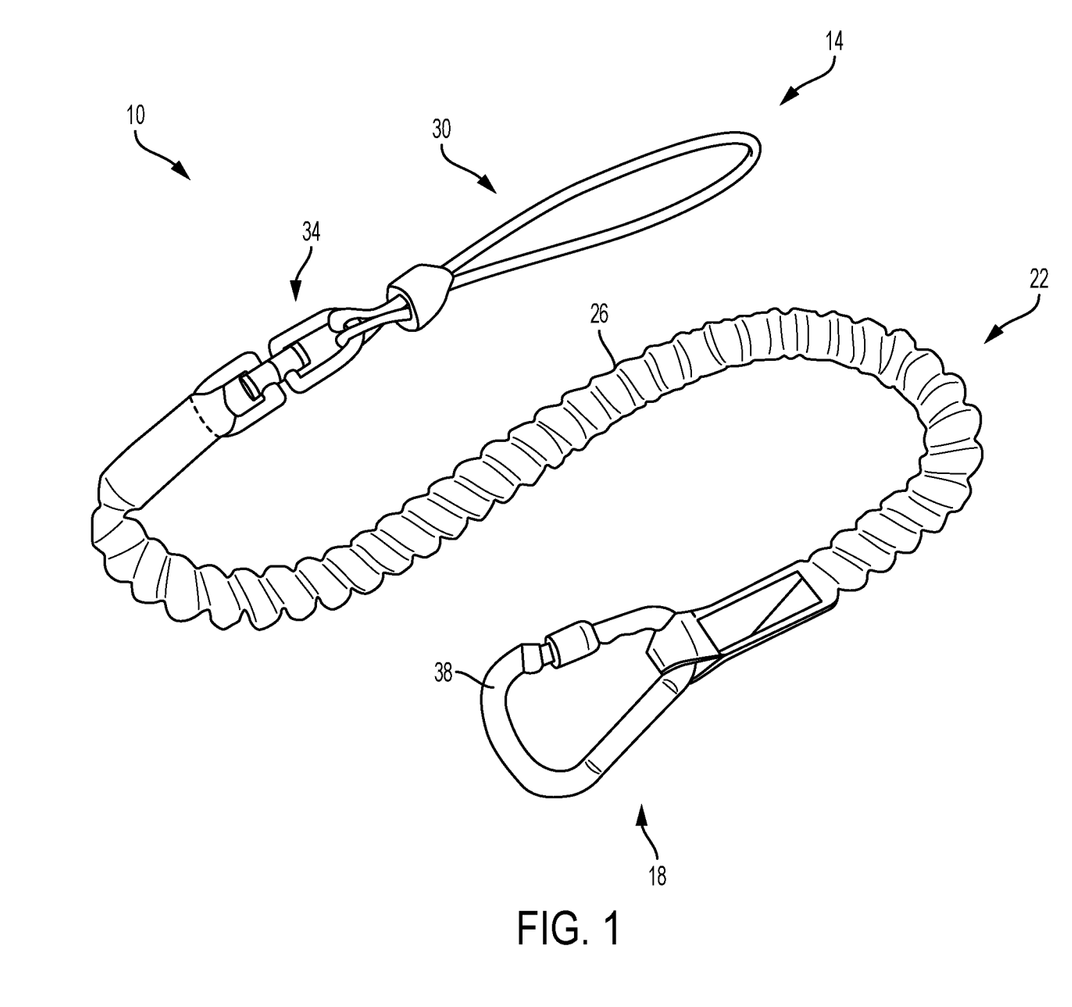
FIG. 1 is a perspective view of a lanyard.

FIG. 1 illustrates a lanyard 10 having a cinch end 14, a locking end 18, and a strap 22 extending between the ends 14, 18. The strap 22 may include elastic material weaved into fabric to allow for some stretching or extension of the strap 22. The strap 22 is part of a shock absorbing body 26 that is able to stretch or expand in response to sudden tension being applied to the lanyard 10. The cinch end 14 includes a heavy duty cinch 30 arranged to attach to a tool (not shown) or other object that is to be secured to the lanyard 10. Preferably, the cinch 30 includes elastic material to allow some stretching to the cinch 30.

A swivel member 34 is positioned between the strap 22 and the cinch 30 to allow full 360 degree rotation of the tool without requiring rotation of the strap 22 or the lanyard 10. In addition, the locking end 18 preferably includes a locking carabiner 38 that facilitates attachment of the lanyard 10 to the user or to another object. Preferably, the carabiner 38 as well as the swivel member 34 are metallic and are weight rated for the particular application.

Figure 2:
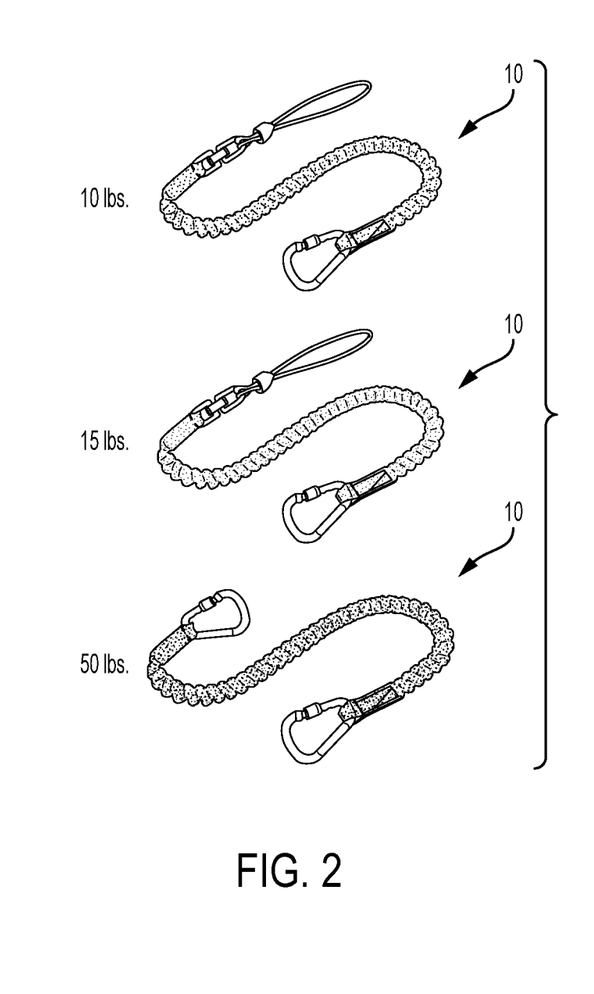
FIG. 2 is a perspective view of a number of color coded lanyards with the color coding indicating the weight rating of the lanyard.

With reference to FIG. 2, the lanyards 10 can be color coded to reflect the weight rating for each of the lanyards 10 such that a user may immediately, visually recognize which lanyard is appropriate for a specific use or tool weight. For example, one arrangement may include a red strap portion indicating it is rated for up to 10 pounds while a black strap indicates a lanyard rated for up to 15 pounds. Other colors (e.g., grey for 50 pound rating) or patterns of colors (e.g., strips) could be employed to indicate other weight ratings as may be desired or required.

Figure 3:
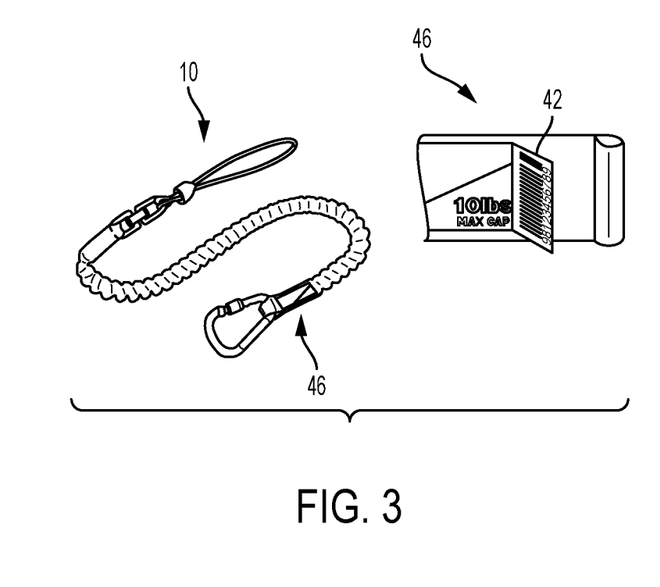
FIG. 3 is a perspective view of an identification tag and a lanyard.

With reference to FIG. 3, the lanyards 10 include an identifier 42 that is part of an identification tag 46. In one embodiment, the identifier 42 is a serial number (e.g., number and/or bar code) and a date code printed on the identification tag 46 which is then sewn to the lanyard 10. In another embodiment, the identifier 42 is an RFID tag with a unique RFID which is attached to the identification tag 46 or directly to the lanyard 10.

Lanyards 10 are regularly inspected to assure that they are not damaged or worn. In addition, the date code allows for a determination of age of the lanyard 10. A tracking system (e.g., a ONE-KEY application) can be used to maintain a record of these inspections and the results. For example, a user could enter the serial numbers from the identification tag 46, or could scan the RFID tags of each of the lanyards 10 to enter them into the tracking system. Then, when a predetermined time period has elapsed, the system can notify the user, (e.g., through the ONE-KEY application) that the lanyard 10 is due to be inspected or replaced. In one embodiment, a user may walk in proximity to one or more lanyards 10, which may transmit a signal to the application (e.g., ONE-KEY) including the lanyard serial number. The tracking system (e.g., ONE-KEY application) can automatically recognize whether the lanyards 10 in the vicinity are due to be inspected or changed and inform the user. In another embodiment, the user can scan the RFID codes of each of the nearby lanyards 10 to determine whether any of the lanyards 10 are due to be inspected or replaced.

Additionally, the identification tags 46 which are sewn onto the lanyards 10 are tubular and sewn at opposing ends of the tube. This provides longer life than a single tag and prevents removal of the tag without destroying the tag.

Figure 4:
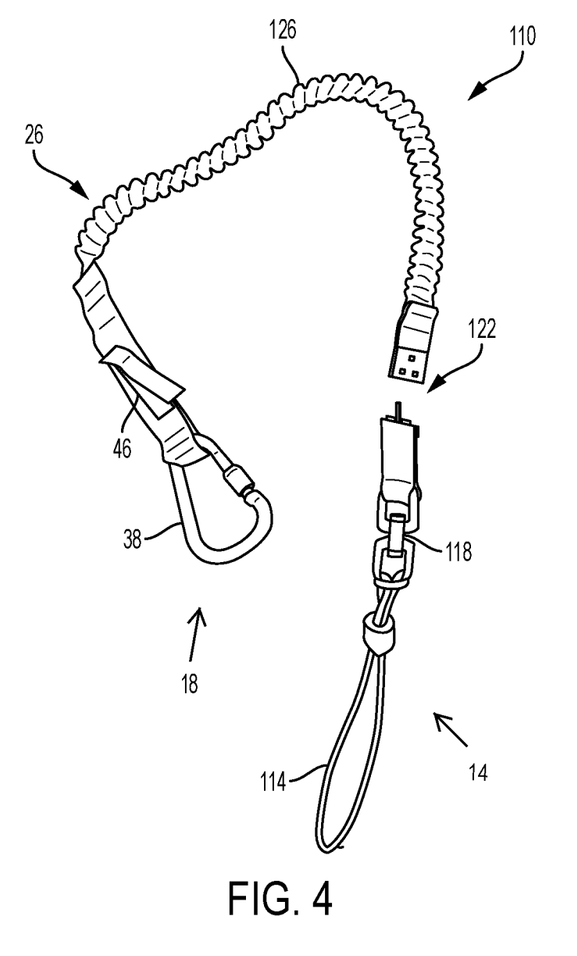
FIG. 4 is a perspective view of a lanyard including a quick connect feature to allow for easy tool changes.

With reference to FIG. 4, another construction of a lanyard 110 is illustrated. The lanyard 110 is similar to the lanyard 10 but includes a quick change feature. The cinch end 14 of the lanyard 110 includes an elastic attachment portion 114 (e.g., a cinch 30) for attaching the lanyard 110 to a tool, a swivel member 118 that allows for 360 degree rotation of the tool with respect to the lanyard 110 and a quick change attachment mechanism 122 positioned between the swivel member 118 and the strap 22 of the lanyard 110. The quick change attachment mechanism 122 allows for the quick change of tools on a single lanyard. Thus, a user can attach a number of cinch ends 112 with quick change attachment mechanisms 122 to various tools, and then can swap out different tools onto the main lanyard portion using the quick change attachment mechanism 122 without having to detach the elastic attachment portion 114 from the tool and apply it to a new tool. Additionally, by positioning the swivel member 118 near the tool, the whole lanyard 110 doesn't get twisted when trying to rotate the tool (as it might if it were located farther away from the tool on the lanyard 110). The construction illustrated in FIG. 4 includes three separate elastic attachment portions 114 that can be quickly attached or detached from the remainder of the lanyard as desired. In other constructions, the lanyard 110 could include any number of separate elastic attachment portions 114.

Figure 5:
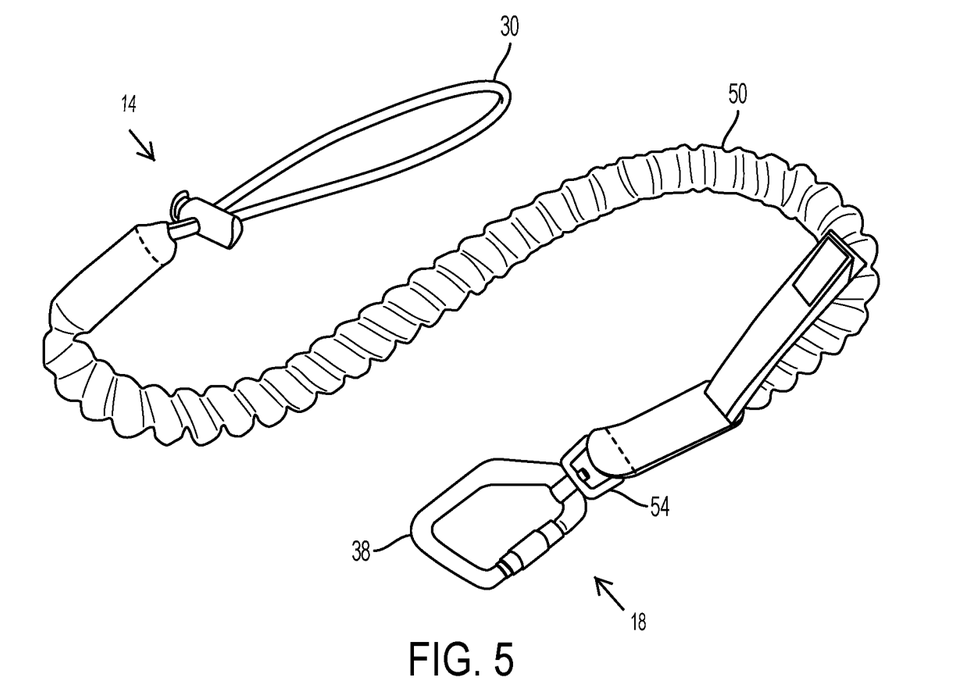
FIG. 5 is a perspective view of a lanyard including a swivel loop or hook to allow for rotation of the carabiner.

In some embodiments, the lanyard includes multiple rubber-like elastomeric strands held together in a woven sheath 50, as shown in FIG. 5. The woven sheath is attached to the carabiner by a swivel loop or hook 54 that is configured to allow 360 degree rotation of the carabiner relative to the sheath 50 and vice versa.

Figure 6:
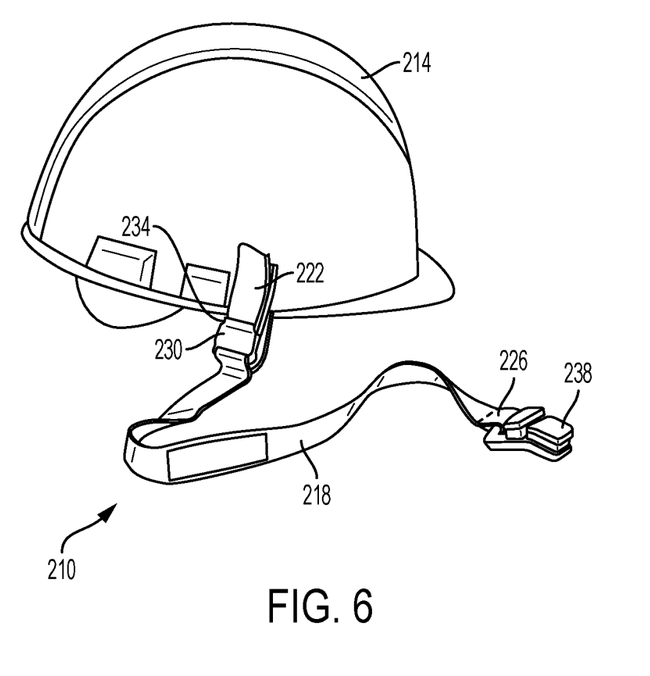
FIG. 6 is a perspective view of a lanyard for a hard hat.

In some embodiments, a lanyard 210 is configured to attach to a hard hat 214 with an aperture (not shown), as shown in FIG. 6. The lanyard 210 has a strap 218 with a first end 222 and a second end 226. The first end 222 includes a first clip 230 and is configured to be threaded through the aperture of the hard hat 214, as well as through the first clip 230. The first clip 230 includes a lever 234 to fix the first end 222 with respect to the strap 218 or, alternatively, allow the first end 222 to be adjusted with respect to the strap 218. The second end 226 of the strap 218 includes a second clip 238 that can clip to, for example, a person's shirt or vest such that if the hard hat 214 falls off the person's head, it is prevented from dropping to the floor.

With reference to FIGS. 7-11, in some embodiments the carabiner 38 includes a frame 314 with a pivot end 318 and a locking end 322. The frame 314 defines an interior aperture 326 within the carabiner 38. The locking end 322 of the frame defines, for example, a bulge 330 that has a relatively greater diameter than the portion of the frame 314 immediately adjacent the locking end 322. The carabiner 38 further includes a locking bar 334 defining an axis 338. The locking bar 334 includes a first end 342 pivotally coupled to the pivot end 318 of the frame 314 via a pivot joint 346, and a second end 350 opposite the first end 342. The locking end 322 of the frame 314 is configured to fit within a recess 354 defined by the second end 350 of the locking bar 334. The locking bar 334 is pivotal about the pivot joint 346 in a plane defined by the frame 314 of the carabiner 38.

Figure 8:
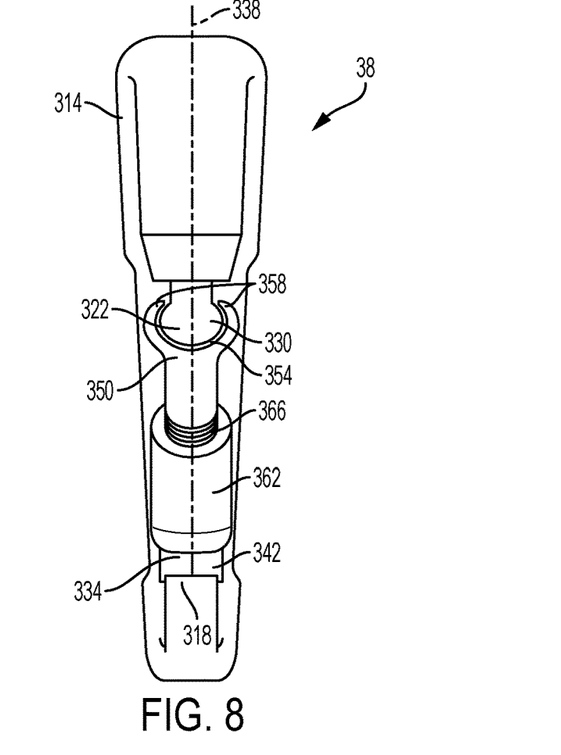
FIG. 8 is a front view of the carabiner of FIG. 7.
Figure 9:
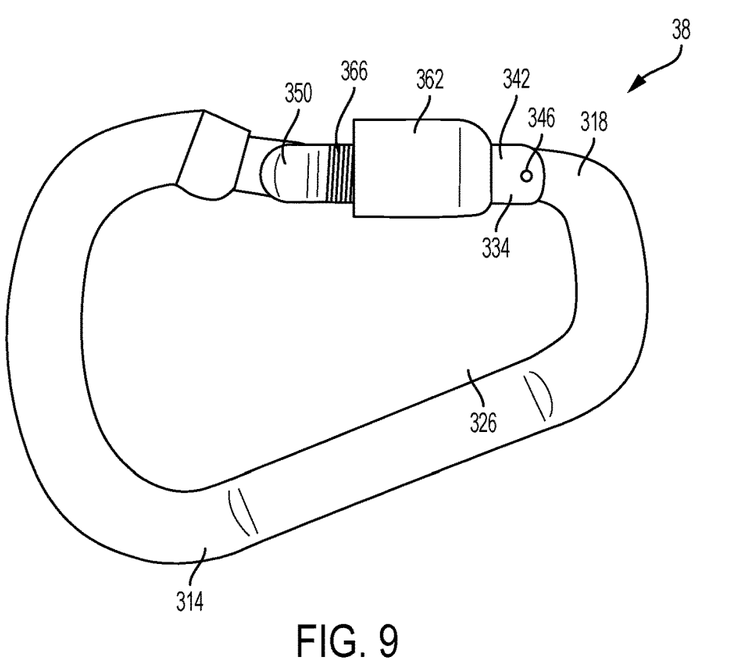
FIG. 9 is another perspective view of the carabiner of FIG. 7.

When the locking end 322 of the frame 314 is fit within the second end 350 of the locking bar 334, the carabiner 38 is in a mating position, as shown in FIGS. 8 and 9. When in the mating position, access to the interior aperture 326 is blocked. A blocking portion or portions 358 of the second end 350 are arranged such that in the mating position, the second end 350 and the locking end 322 are prevented from moving with respect to each other along the axis 338. Thus, if a force is applied to the locking bar 334 or the locking end 322 in either direction along the axis 338, the locking end 322 and the second end 350 of the locking bar 334 will resist breaking. The locking bar 334 and the frame 314 may be made of, for example, 6063 aluminum. In another embodiment, the locking bar 334 and the frame 314 may be made of, for example, 6061 aluminum.

However, when in the mating position, the locking bar 334 is permitted to pivot (indicated by arrow 360) outwardly from the frame 314 and about the pivot joint 346 to separate the second end 350 of the locking bar 334 from the locking end 322 of the frame 314. In some embodiments, the locking bar 334 may be prevented from pivoting towards the interior aperture 326. Once the locking bar 334 is pivoted outwards, access to the interior aperture 326 is permitted. In other embodiments, the second end 350 of the locking bar 334 may define, for example, the bulge 30 and the locking end 322 of the frame 314 may include the blocking portion 358 and define the recess 354 configured to receive the second end 350 of the locking bar 334. In some embodiments, the locking bar 334 is biased towards the mating position by a biasing member (not shown).

Figure 7:
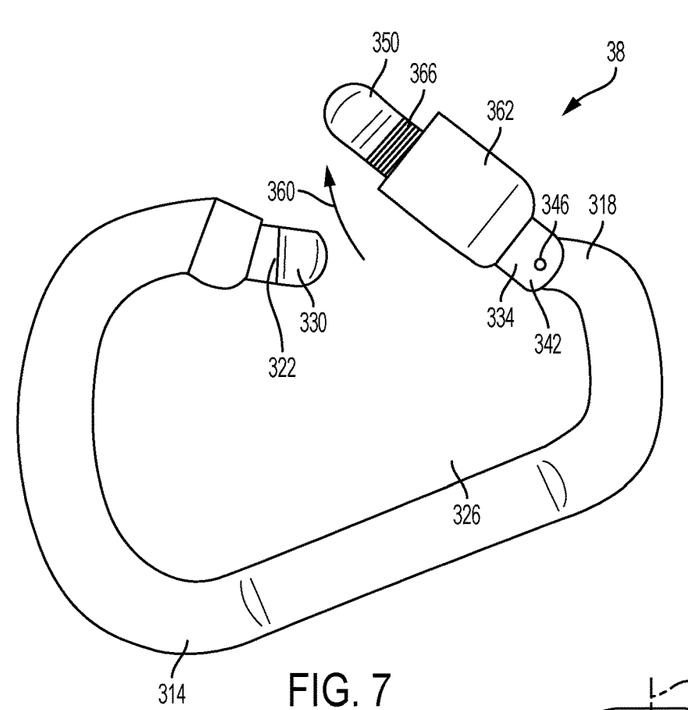
FIG. 7 is a perspective view of a carabiner.
Figure 10:
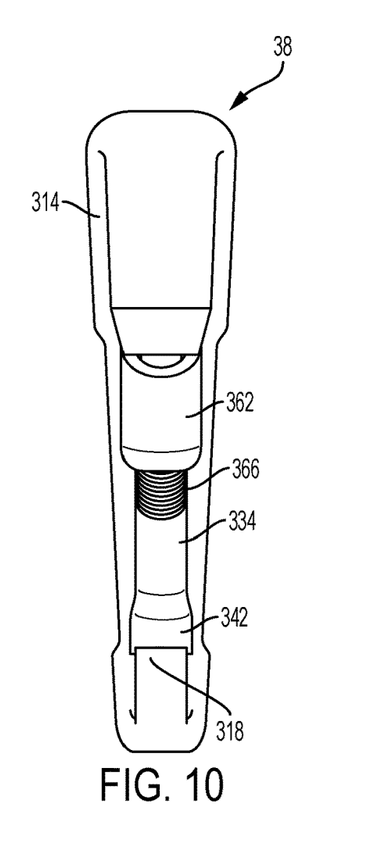
FIG. 10 is another front view of the carabiner of FIG. 7 in a locked position.
Figure 11:
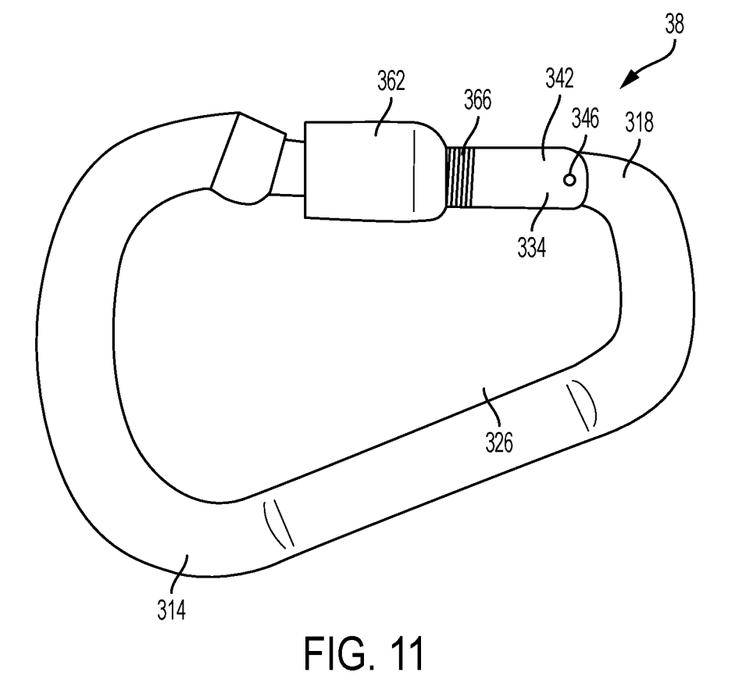
FIG. 11 is another perspective view of the carabiner of FIG. 7 in a locked position.

The carabiner 38 also includes a sleeve 362 coaxially arranged about the locking bar 334. The sleeve 362 may be twisted or rotated along the locking bar 334 via, for example, threads 366, to adjust the sleeve 362 relative to the locking bar 334 along the axis 338. In an unlocked position, the sleeve 362 is distant from the second end 350 of the locking bar and the locking end 322 of the frame 314, as shown in FIGS. 7-9. In the unlocked position, the locking bar 334 may freely pivot about the pivot joint 346 between the mating position and a separated position, as indicated by the arrow 360 in FIG. 7. In a locked position, as shown in FIGS. 10 and 11, the sleeve 362 is adjusted along the axis 338 to a position in which it surrounds the second end 350 of the locking bar 334 and/or the locking end 322 of the frame 314. In the locked position, the locking bar 334 is prevented from pivoting about the pivot joint 346, and is thus restrained in the mating position.

Various features and advantages of the invention are set forth in the following claims.

What is claimed is:

1. A lanyard assembly comprising:
    a strap having a first end and a second end;
    a swivel member coupled to the first end and adjacent the first end;
    a cinch coupled to the swivel member, the swivel member permits rotation between the cinch and the strap;
    a carabiner coupled to the second end and adjacent the second end of the strap, the carabiner including,
        a frame having a first diameter, the frame having a pivot end and a locking end, the locking end further comprising a bulge that has a second diameter that is greater than the first diameter,
        an interior aperture defined by the frame,
        a locking bar having a first end pivotally coupled to the pivot end, a second end, opposite the pivot end, and an axis extending between the first end and the second end, wherein the second end includes opposing blocking portions having opposing inner surfaces facing the axis and defining a recess between the opposing inner surfaces, wherein, when the locking bar is pivoted to a mating position, the opposing blocking portions of the locking bar surround the bulge of the locking end of the frame such that the bulge fits within the recess, the locking bar pivoting outwardly from the frame; and
    wherein, when the second end of the locking bar is in the mating position with the bulge of the locking end, the locking end and the second end of the locking bar are prevented from moving with respect to each other along the axis.

2. The lanyard assembly of claim 1, wherein the carabiner is made of 6061 aluminum.

3. The lanyard assembly of claim 1, further comprising a biasing member, wherein the locking bar is biased towards the mating position by the biasing member.

4. The lanyard assembly of claim 1, wherein the locking bar of the carabiner further includes a sliding sleeve that locks and unlocks the locking bar in the mating position.

5. The lanyard assembly of claim 1, wherein the opposing inner surfaces of the locking bar are curved surfaces that surround a portion of a curved outer surface of the bulge.

* * * * *